United States Patent Office 3,752,760
Patented Aug. 14, 1973

3,752,760
SILT REMOVAL
Robert Cornelius Gordon, Jr., Rochester, Jerry Lee Walker, Coraopolis, Andrew Jackson Sharpe, Jr., Mc-Murray, and Jerry Emile Boothe, Pittsburgh, Pa., assignors to Calgon Corporation, Pittsburgh, Pa.
No Drawing. Filed Mar. 9, 1972, Ser. No. 233,322
Int. Cl. C02b 5/06
U.S. Cl. 210—58
8 Claims

ABSTRACT OF THE DISCLOSURE

Polymers of certain N-(alkyl) amino acrylamides are useful to remove and prevent silt accumulations in water systems, such as cooling systems and the like. The preferred monomer is (3-acrylamido-3-methyl) butyl trimethyl ammonium chloride; this monomer may be homopolymerized or present to the extent of at least 1 percent in a water-soluble polymer of at least 100,000 molecular weight.

BACKGROUND OF THE INVENTION

Much of the water which is used in industrial cooling systems, such as for example, the cooling systems in blast furnaces, open hearth furnaces and the like in the steel industry, and cooling towers in the oil industry, is derived from rivers, ponds, lakes or other sources of impure natural waters. These natural waters carry various amounts of silt, mud, and/or organic wastes and other accumulations which deposit on heat exchange surfaces and create problems of corrosion, loss of heat transfer efficiency, and the like, as well as reducing the area of the passageways and thus the amount of cooling water which can be circulated. In installations, such as in the surface condensers associated with turbine generators, alluvium very seriously affects the rate of energy conversion. In other areas, such as in pipes, sewers, heated water lines, etc., the alluvium tends to block the passage of water, creating serious problems in water flow.

In many industrial heat exchange installations and in many pipe line systems carrying natural waters, operations must be halted periodically so that the system can be cleaned out mechanically or with acid or some other means. This is obviously an expensive and highly undesirable situation.

Various attempts have been made in the past to control and/or remove silt deposits from water systems through the use of water-soluble polymers. For example, see Zimmie et al. U.S. Pat. 3,085,916, wherein polyacrylamide is employed, Flock U.S. Pat. 3,288,640, which discloses the use of polyethyleneimine, and Zierden U.S. Pat. 3,503,879, which uses high molecular weight potassium metaphosphate. We are also aware of the use of N-sulfohydrocarbon-substituted acrylamides for this purpose. See Canadian Pat. 864,433 for a description of the polymer.

The use of such polyelectrolytes as described above has certain limitations, however. Their function and efficiency appears to vary from day to day and from plant to plant. Since the composition of water and the silt-like substances therein is infinitely variable, it has been very difficult to predict the success of a given treatment on a given day.

We believe the strongly cationic nature of the polymers herein proposed contributes significantly to the success of our invention.

SUMMARY OF THE INVENTION

Our invention contemplates the use of water-soluble polymers including at least 1 percent by weight monomers of the formula

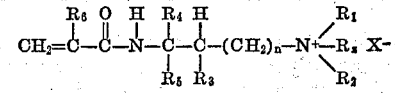

in which $R_1$ and $R_2$ are independently selected from linear and branched alkyl groups having up to 18 carbon atoms, aralkyl groups having up to 10 carbon atoms, and in which $R_1$ and $R_2$ may be combined to form a heterocyclic group having one or more hetero atoms; $R_3$ is selected from the group of hydrogen, lower alkyl groups of 1 to 4 carbon atoms and halogen; $R_4$ is selected from the group of hydrogen, halogen, a linear or branched alkyl group of up to 5 carbon atoms; $R_5$ is phenyl, lower alkyl (1 to 4 carbon atoms), substituted phenyl wherein the substituents may be lower alkyl (1 to 4 carbon atoms), or lower alkoxy (1 to 4 carbon atoms); $R_3$ or $R_4$ can combine with $R_5$ to form a cyclic group of at least 6 carbon atoms or a bicyclic group of at least 7 carbon atoms, which groups can be substituted with a linear or branched alkyl group having up to 5 carbon atoms; $R_6$ is selected from hydrogen and methyl; $R_Z$ may be any group capable of quaternizing the nitrogen, including the group consisting of hydrogen, benzyl, phenethyl, cyanoethyl, and linear, branched and substituted alkyl and aralkyl groups having 1 to 16 carbon atoms, the substitutions therefor being halide, —OH, —COO—, and —$SO_3^-$, where the counter ion for the anionic substitution is normally hydrogen or alkali metal; $X^-$ may be any anion, preferably halide, alkosulfate, tosylate, carboxylate, sulfonate, sulfate, phosphate, acetate, or nitrate; and $n$ is an integer from 0 to 2.

The monomer may be copolymerized with any copolymerizable water-soluble monomer. Among the copolymerizable monomers useful in our invention are acrylic acid, methacrylic acid, the alkali metal, amine and ammonium salts of acrylic and methacrylic acids, methacrylamide, β-aminoethyl acrylate, β-aminoethyl methacrylate, N-methyl-β-aminoethyl acrylate, N-methyl aminoethyl methacrylate, N,N-dimethyl β-aminoethyl methacrylate, and the water-soluble N-alkyl substituted acrylamide and methacrylamides such as N-isopropyl acrylamide. Still other comonomers of the water-soluble class are the alkali metal styrene sulfonates, and alkali metal vinylbenzoates. Also useful are allyl alcohol, N-vinyl pyridine, N-vinyl pyrrolidone, and N-vinyl-2-oxazolidone.

Water-insoluble monomers may also be employed in the copolymers so long as the copolymers are soluble in water to the extent of 0.05 percent. Suitable monomers are styrene, methylacrylate, acrylonitrile, butadiene, and methyl methacrylate. All polymers and copolymers should have molecular weights of at least 100,000.

Preferred copolymers are copolymers of (3-acrylamido-3-methyl) butyl trimethyl ammonium chloride (AMBTAC)

and acrylamide. We prefer to use polymers having from about 1 to 100 percent poly AMBTAC and 0 to 99 percent acrylamide, and more particularly, 70 to 90 percent acrylamide and 10 to 30 percent AMBTAC. The acrylamide (AM) portion of the polymer may be hydrolyzed to the extent of up to 80 mole percent of the available acrylamide.

While we do not wish to be bound by any theories, it appears that the compounds of our invention remove alluvial deposits from surfaces by dispersing the deposits into the water stream and agglomerating the deposits into a mobile floc which can be carried away from the surfaces by the water stream. Several laboratory experiments described herein illustrate this dispersing and flocculating effect.

We have found that a polymer or copolymer's ability to remove and prevent silt accumulation in water systems can be predicted from the polymer or copolymer's ability to flocculate suspended silt deposits taken from such systems.

Some silt deposits are best removed or prevented by a strongly anionic polymer, while others are best removed or prevented by the most strongly cationic polymers. In addition, certain types of silt deposits are best controlled through the use of a nonionic polymer or copolymer. Although chemical analyses of these silt deposits often reveals only slight differences, we have been able to develop two synthetic silts, one of which is typical of those silt deposits controllable by an anionic polymer or copolymer and one of which is controllable by a cationic polymer.

Compositions of the synthetic silts are as follows.

TABLE 1

Synthetic silt composition for anionic polymers

| Material: | Weight percent |
|---|---|
| Pure yellow oxide (Goethite) | 20 |
| Red anhydrous ferric oxide | 20 |
| Red anhydrous ferric oxide | 10 |
| Black ferric oxide | 20 |
| Iron metal | 10 |
| Aluminum oxide, ignited powder | 3 |
| Calcium oxide | 2 |
| Zinc oxide | 3 |
| Kaolin | 4 |
| Silica | 4 |
| Calcium carbonate | 4 |

For cationic polymers, the composition is 97 percent by weight finely divided $SiO_2$, 1 percent hectorite, and 2 percent of the anionic synthetic silt composition shown in Table 1.

Surprisingly, excellent flocculation of both of these synthetic silts was obtained by use of the polymers and copolymers of this invention. In the case of the synthetic silt typical of those field or industrial silts best controlled by an anionic polymer, 2.5 grams of the synthetic silt was added to 250 milliliters distilled water in a 250 milliliters graduate cylinder. The cylinder was then inverted five times and the time required for the silt to settle to a total accumulation (height) of 10 milliliters was recorded. The polymer or copolymer was then added to a concentration of 0.4 p.p.m. and the graduate again inverted five times and the time in seconds to settle to an accumulation of 10 milliliters was recorded. These results are shown in Table 2.

TABLE 2

| Polymer (weight ratios): | Time/10 milliliters, seconds |
|---|---|
| 80 AM/20 AMBTAC | 25 |
| 50/50 | 25 |
| 20/80 | 30 |
| 0/100 (homopolymer) | 35 |
| 49 AM/51 AMPSA (partially hydrolyzed) | 23 |
| Control (no treatment) | 180 |

On the other hand, the synthetic silt typical of those field silts best controlled by cationic polymers or copolymers gave the results as shown in Table 3 when treated with 1 p.p.m. of the polymers or copolymers of this invention.

TABLE 3

| Polymer: | Time/10 milliliters, seconds |
|---|---|
| 80 AM/20 AMBTAC | 45 |
| 50/50 | 30 |
| 20/80 | 20 |
| 0/100 (homopolymer) | 12 |
| Homopolymer of dimethyl diallyl ammonium chloride | 15 |
| Control (no treatment) | 200 |

In addition, a silt deposit collected from a midwest paper mill's surface condenser was evaluated in the normal manner. The relative effectiveness of various polymers and copolymers to flocculate this field (industrial) silt deposit sample is shown in Table 4, with the most effective being rated as number 1 and the least effective as number 4.

TABLE 4

| Material: | Rating |
|---|---|
| AMBTAC homopolymer | 1 |
| Dimethyl diallyl ammonium chloride homopolymer | 2 |
| Polyethyleneimine homopolymer | 3 |
| Control (no polymer) | 4 |
| Acrylamide/2-acrylamide propyl sulfonic acid copolymer (anionic, 49 AM/51 2-AMPSA, acrylamide hydrolyzed 50 percent) | 4 |
| Hydrolyzed polyacrylamide (35 percent hydrolyzed | 4 |

The dimethyl diallyl ammonium chloride homopolymer and polyethyleneimine homopolymer were about equal, but considerably less effective than AMBTAC.

The AM/2-AMPSA and hydrolyzed polyacrylamide showed no significant differences during test period.

Preferably we add to the water system and/or maintain in a water system at least about 0.05 p.p.m. of the desired polymer in order to prevent deposits from forming. Of course, greater concentrations may be necessary initially and for a period of time theerafter to clean a system which is already laden with deposits. Large concentrations may be added or maintained in a water system without apparent ill effect, but it is uneconomical and wasteful to maintain concentrations in excess of about 30 p.p.m. The system is preferably periodically flushed out.

A satisfactory and often more economical alternative method of practicing our invention is to periodically add to the water in the system relatively higher concentrations of the compounds of our invention for a short period of time. In this embodiment of our invention, we prefer to maintain concentrations of at least about 1 p.p.m. based on mass flow of water in the system, for periods usually of about 30 minutes to 2 hours, at least about once a week, although the interval between such periods of addition may range from about 4 hours to about 7 days or more. An interval should be chosen for each system which will maintain the heat exchange efficiency of the system continuously at a high level.

We claim:

1. Method of controlling the deposition of alluvium and silt in a water system comprising adding to said system at least 0.05 p.p.m. of a water-soluble polymer containing at least 1 percent by weight of a cationic monomer of the formula

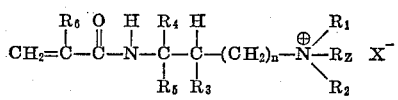

in which $R_1$ and $R_2$ are independently selected from linear and branched alkyl groups having up to 18 carbon atoms, aralkyl groups having up to 10 carbon atoms, and in which $R_1$ and $R_2$ may be combined to form a heterocyclic group having one or more hetero atoms; $R_3$ is selected from the group of hydrogen, lower alkyl groups of 1 to 4 carbon atoms and halogen; $R_4$ is selected from the group of hydrogen, halogen, a linear or branched alkyl group of up to 5 carbon atoms; $R_5$ is phenyl, lower alkyl (1 to 4 carbon atoms), substituted phenyl wherein the substituents may be lower alkyl (1 to 4 carbon atoms), or lower alkoxy (1 to 4 carbon atoms); $R_2$ or $R_4$ can combine with $R_5$ to form a cyclic group of at least 6 carbon atoms or a bicyclic group of at least 7 carbon atoms, which groups can be substituted with a linear or branched alkyl group having up to 5 carbon atoms; $R_6$ is selected from hydrogen and methyl; $R_Z$ may be any group capable of quaternizing the nitrogen, including the group consisting of hydrogen, benzyl, phenethyl, cyanoethyl, and linear, branched and substituted alkyl and aralkyl groups having 1 to 16 carbonatoms, the substitutions therefor being halide, —OH, —COO⁻, and —SO₃⁻, wherein the counter ion for the anionic substitution is normally hydrogen or alkali metal; X⁻ may be any anion, preferably halide, alkosulfate, tosylate, carboxylate, sulfonate, sulfate, phosphate, acetate, or nitrate; and $n$ is an integer from 0 to 2.

2. Method of claim 1 n which the cationic polymer contains at least 1 percent by weight (3-acrylamido-3-methyl)butyl trimethyl ammonium chloride.

3. Method of claim 1 in which the polymer is a homopolymer of (3-acrylamido-3-methyl)butyl trimethyl ammonium chloride.

4. Method of claim 1 in which the polymer is at least 0.05 percent soluble in water.

5. Method of claim 2 in which the polymer is a copolymer of (3-acrylamido-3-methyl)butyl trimethyl ammonium chloride and acrylamide.

6. Method of controlling the deposition of alluvium and silt in a water system comprising adding and maintaining therein at least about 0.05 p.p.m. of a copolymer of 70 to 99 percent acrylamide and a 1 to 30 percent (3-acrylamido-3-methyl) butyl trimethyl ammonium chloride.

7. Method of claim 6 in which the acrylamide portion of the polymer is at least partially hydrolyzed.

8. Method of claim 1 including the step of flushing out of the system the alluvial particles agglomerated by the polymer.

References Cited
UNITED STATES PATENTS

| | | | |
|---|---|---|---|
| 3,472,767 | 10/1969 | Lees | 210—54 X |
| 3,579,445 | 5/1971 | Tate | 210—58 |
| 3,692,673 | 9/1972 | Hoke | 210—52 |

MICHAEL ROGERS, Primary Examiner

U.S. Cl. X.R.

134—22; 210—54; 252—180